Sept. 3, 1968                D. W. BERREMAN                3,399,942
             GAS LENS EMPLOYING TWO OPPOSITELY FLOWING GASES
                    HAVING UNEQUAL REFRACTIVE INDICES
Filed June 5, 1964                                3 Sheets-Sheet 1

INVENTOR
D. W. BERREMAN
BY
*H. O. Wright*
ATTORNEY

United States Patent Office 3,399,942
Patented Sept. 3, 1968

3,399,942
GAS LENS EMPLOYING TWO OPPOSITELY FLOW-
ING GASES HAVING UNEQUAL REFRACTIVE
INDICES
Dwight W. Berreman, Westfield, N.J., assignor to Bell
Telephone Laboratories, Incorporated, New York,
N.Y., a corporation of New York
Filed June 5, 1964, Ser. No. 372,992
4 Claims. (Cl. 350—179)

ABSTRACT OF THE DISCLOSURE

This application describes apparatus and methods for focusing an optical beam by means of flowing gases. In the embodiments described, two transparent gases, having different refractive indices, are caused to flow into an enclosure in opposite directions, thereby establishing a curved interface between them extending along a direction transverse to the direction of beam propagation. The result is to create a transparent gas lens which focuses the beam. A hollow, porous nozzle inserted in one of the ports, increases the curvature of the interface, thereby decreasing the focal length of the lens.

---

This invention relates to the long distance transmission through a conduit of beams of ultrahigh frequency electromagnetic waves including visible light and adjacent energy bands. More particularly, it relates to an improved arrangement for inducing increased lens or focusing action at the interface between two streams of gas of substantially differing refractive indices.

The present application is directed to an improvement of the arrangements disclosed and claimed in my copending application, Ser. No. 353,689, filed Mar. 23, 1964, and assigned to the assignee of the present application. Said copending application is accordingly incorporated by reference and thus made an integral part of the disclosure of the present application.

In my said copending application it is taught that a gas lens may be formed in a conduit, through which a laser beam or the like is to be transmitted, by opposing flows of transparent gases of substantially differing refractive indices to establish a curved interface between them of approximately spherical shape in the path of the beam and transversely thereto.

A principal object of the present invention is to increase the lens or focusing action of gas lenses of the type disclosed in my above-mentioned copending application.

This is accomplished in accordance with the present invention by providing a mesh nozzle, which may be of wire or other suitably stiff material, at the end of a pipe from which a stream of gas of one refractive index is propelled into the stream of gas of the other refractive index.

It is believed that the much shorter focal length achieved by use of the wire or other mesh nozzle termination results from a mixing of the gas of greater refractive index with the gas of smaller refractive index over a longer distance with greater radial variation in concentration and greatly increased curvature of the effective interface between the two gases.

Figure 1:
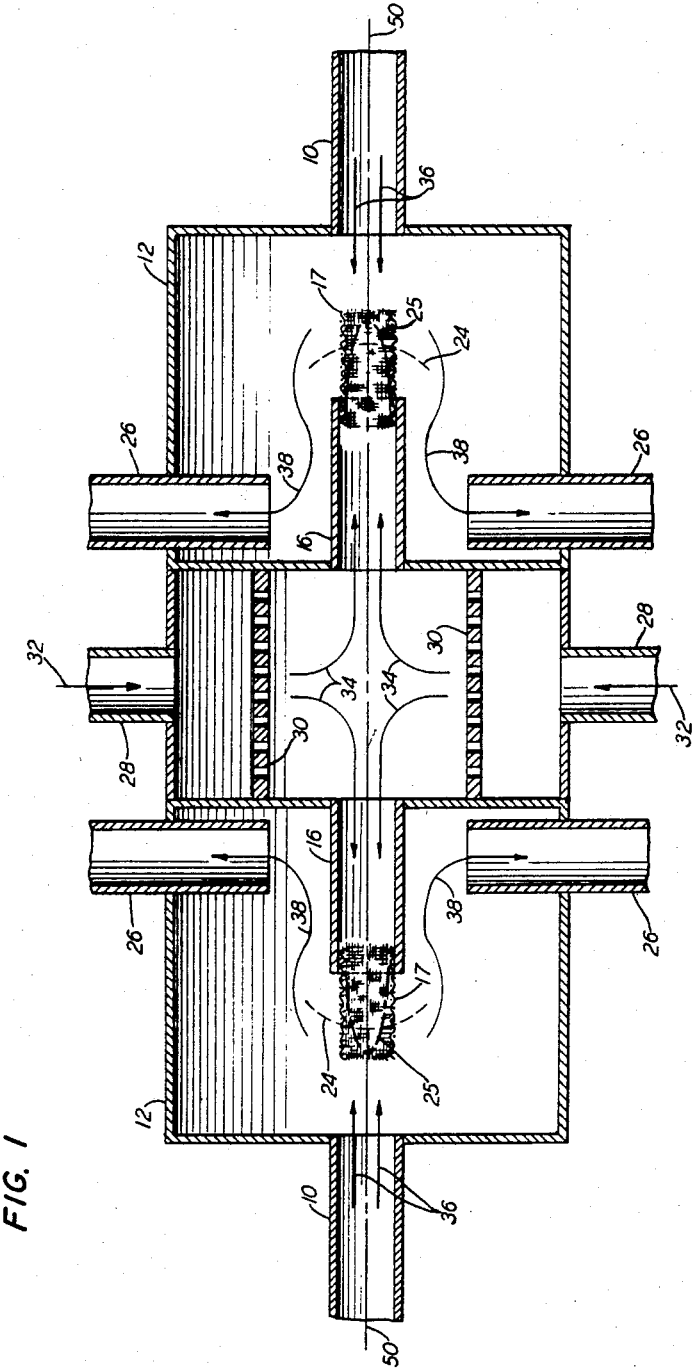
Figure 2:
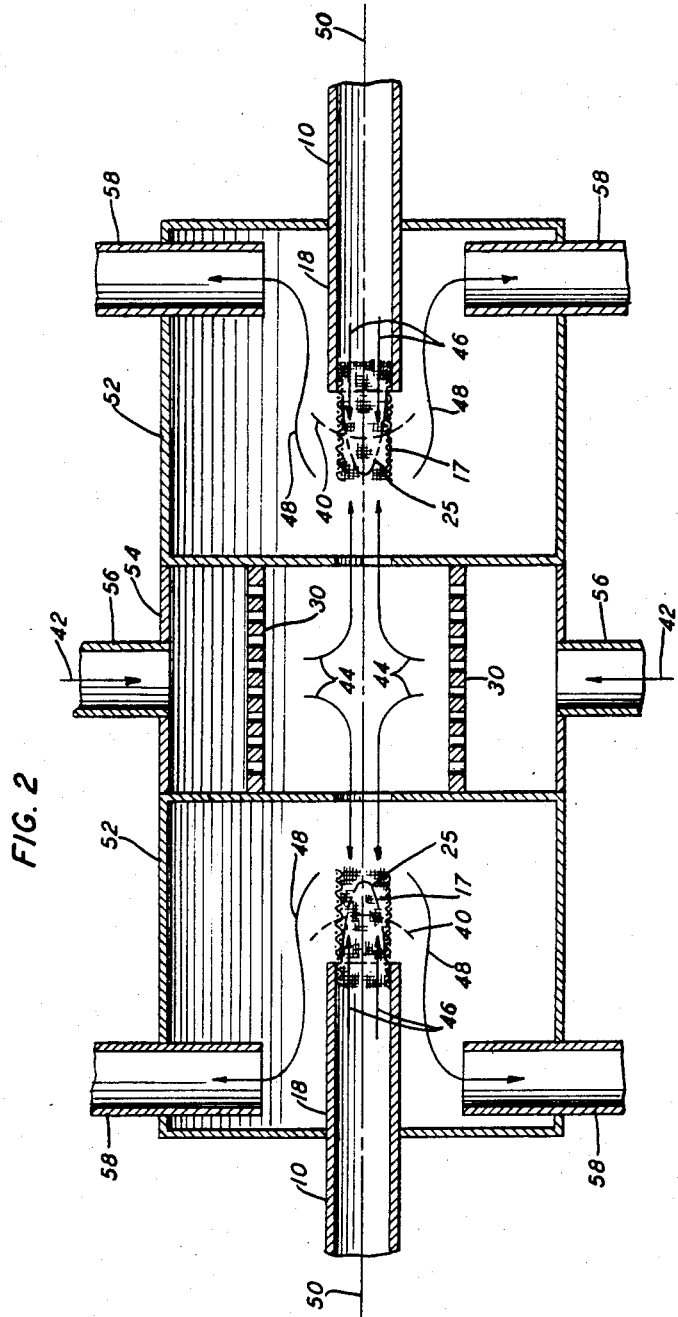
Figure 3:
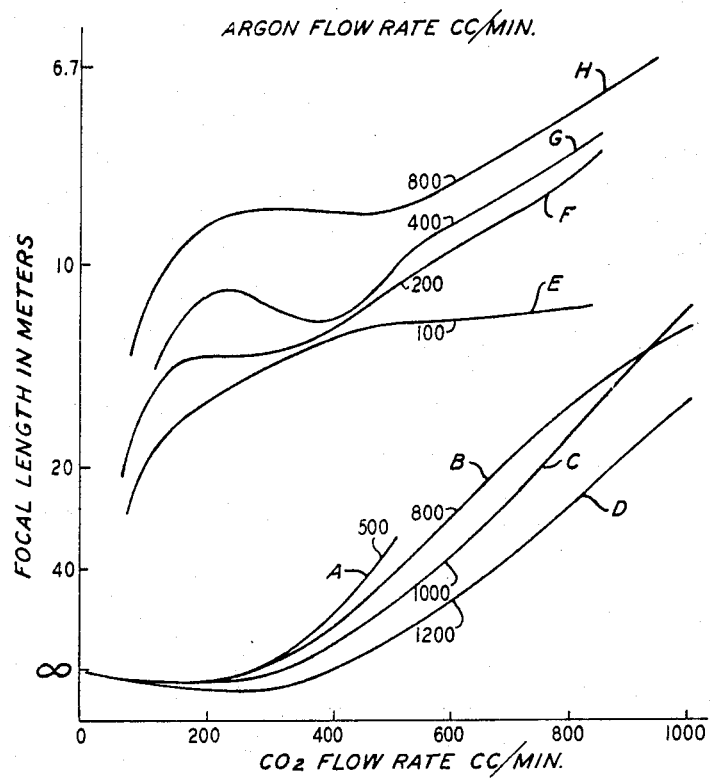

Other and further objects, features and advantages of the invention will become apparent from a perusal of the following detailed description of an illustrative embodiment of the invention taken in conjunction with the appended claims and the accompanying drawing, in which:

FIG. 1 illustrates a first structural embodiment of the principles of the invention;

FIG. 2 illustrates a second structural embodiment of the principles of the invention; and FIG. 3 shows illustrative characteristic curves correlating the focal length of lens arrangements of the invention with the flow rates of two gases of differing refractive indices and for purposes of comparison similar characteristic curves for corresponding arrangements of applicant's above-mentioned copending application which do not include the wire or other mesh nozzles of the present invention.

In more detail, in FIGS. 1 and 2, ignoring for the moment the mesh nozzles 17 and the indicated fronts or interface surfaces 25, the structures are precisely that of FIGS. 1 and 2, respectively, of my above-mentioned copending application, and are described in detail in said copending application starting at p. 4, line 6 through p. 8, line 19, inclusive.

STRUCTURE OF APPLICANT'S COPENDING APPLICATION

The end portions 10 represents portions of a long conduit having a longitudinal axis 50. It is contemplated that a laser beam or the like is to be transmitted through the conduit in a long distance ultrahigh frequency beam transmission system which may interconnect widely spaced terminal points as, for example, New York and Chicago.

Periodically, in accordance with the invention (of my copending application) a group of (preferably) three cylindrical cavities or chambers 12, 14 and 12, each of a transverse diameter substantially greater than the diameter of conduit 10 and a length approximately equal to one-half its own diameter, are, in effect, inserted in tandem relation with conduit 10, the central chamber 14 being interconnected with the adjacent chambers 12 by short cylindrical members 16 of a diameter substantially the same as that of conduit 10. Members 16 protrude well into their associated chambers 12, as shown.

The chambers 12 and 14 have two or more ports or openings 26 and 28, each, respectively, in their outermost peripheral surfaces, as shown, symmetrically positioned around axis 50 of the conduit.

In the arrangement of FIG. 1, it is contemplated that a transparent gas of a relatively lower refractive index such as helium or clean air or the like is to be injected into conduit 10 on both sides of the group of three chambers by any of numerous convenient means well known to those skilled in the art in such a manner or at such a distance from the chambers 12 that a smooth unidirectional flow free from any substantial turbulence enters the chambers 12 on the left and right as indicated by the arrows 36. Similarly, a flow of a transparent gas indicated by arrows 32 of appreciably greater index of refraction such as $CO_2$, or the like, is injected into chamber 14 through peripheral ports 28 by any of numerous conventional means. Gas 32 flows through perforated baffle members 30 to inhibit turbulence and then from chamber 14 to the left and right chambers 12 through tubular members 16 as indicated by arrows 34 at the left and right respectively of chamber 14.

The flows of the gases indicated by arrows 34 and 36 are respectively adjusted so that the chambers 12 are in large part filled with gas of the lower refractive index except for the regions at the ends of members 16 bounded by the dotted lines 24, respectively, in which regions the higher refractive index gas predominates. Thus fronts or interfaces of substantially spherical contour between the gases of lower and higher indices are established at lines 24 within the chambers 12 to the left and right of chamber 14 as shown. Of course, there will be some diffusion of the lighter gas into the heavier gas in the just mentioned regions but the net refractive index in these regions will be higher than that of the gas largely of the lower refractive index in the remainders of chambers 12.

A sufficient volume of the combined gases predominately of the lower index gas is removed or allowed to escape as indicated by the arrows 38 through peripheral vents 26 from the chambers 12 that in view of the flushing action thus effected no appreciable further diffusion of the respective gases into each other near the respective centers of chambers 12 than indicated by the broken lines, that is, the fronts (or interfaces) 24, will take place. Members 26 extend into their respective associated chambers 12 sufficiently to cause the gases being exhausted to travel in approximately horizontal paths from the centers of chambers 12 to the members 26.

Since the gas between the fronts 24 is of higher refractive index than that in the conduit 10 and the remainders of the chambers 12, and the fronts 24 are convex, the arrangement of FIG. 1 establishes a positive or converging "gas lens" adjacent each front 24, the two "lenses" so formed having together a relatively very long focal length. Since the fronts are substantially concentric with axis 50 and transverse to axis 50, they will act to correct the tendency of the rays of the beam to spread or to diverge from axis 50.

Obviously, a single lens can be realized by omitting one of the chambers 12 and its associated coupling member 16 and connecting the conduit 10 on the side of the omitted chamber directly through a transversely positioned partition of plane optical glass, or the like, to chamber 14.

As a typical design of an arrangement as illustrated in FIG. 1, the diameter of conduit 10 may be one-half inch, the diameters of the chambers 12 and 14 may be four inches, the axial dimensions of chambers 12 and 14 may each be two inches, the diameters of coupling members 16 may be one-half inch, and the diameters of ports 26 and 28 assuming four ports per chamber may each be one-quarter inch. The gas of lower refractive index may be helium or air where the gas of higher refractive index is air or carbon dioxide, respectively. Also, the combination of helium for the lower index gas and carbon dioxide for the higher index gas may be employed. The volume of gas injected from conduit 10 into each chamber 12 may be approximately 0.8 cubic foot per minute. The volume of gas injected from chamber 14 into each chamber 12 may be approximately 0.2 cubic foot per minute. The volume of the combined gases exhausted from each chamber 12 may then be approximately one cubic foot per minute. The combined focal length of the two lenses at fronts 24 will then be substantially 200 feet, for the combinations of helium and air, and air and carbon dioxide, or 100 feet for the combination of helium and carbon dioxide as the gases of lower and higher refractive indices, respectively.

Somewhat smoother action, involving an appreciable reduction of distortion from such disturbing factors as convection effects and the like, may be obtained by employing two supplies of gas which have appreciably different indices of refraction but substantially the same densities. A combination of this type, by way of example, is argon as the low index of refraction gas and a well integrated mixture of six parts of carbon dioxide with one part of methane as the high index of refraction gas. Many other such combinations can be readily selected by those skilled in the art. The specific additional combination last mentioned above will result in a combined focal length of substantially 200 feet for the two lenses at fronts 24 in the above described illustrative arrangement.

Reducing the dimensions of the above described specific illustrative arrangement by one half or doubling the effective pressures within the chambers 12 will reduce the effective focal length by substantially one half.

In FIG. 2 (again, of course, ignoring for the moment mesh nozzles 17 and indicated interface surfaces 25), an arrangement similar to that of FIG. 1 is shown. It differs from that of FIG. 1 in that gas of a higher refractive index indicated by arrows 46 is injected from conduit 10 through a coupling member or extension 18 into each of the chambers 52 and gas of a lower refractive index indicated by arrows 44 is injected from chamber 54 to each of the chambers 52. This lower index gas enters chamber 54 through ports 56 as indicated by arrows 42 and passes through perforated baffles 30 to inhibit turbulence.

In the arrangement of FIG. 2, therefore, "fronts" (or interface surfaces between the gases 44 and 46) are established as indicated by the dotted or broken lines 40 at the inner ends of members 18 respectively as shown. Obviously, the arrangement of FIG. 2 is substantially equivalent from an operational standpoint with that of FIG. 1.

THE PRESENT INVENTION

The improvement of the present invention is achieved, for example, by attaching a mesh nozzle 17 at the output ends of each of the tubes 16 of FIG. 1 and tubes 18 of FIG. 2 as shown. Nozzles 17 may conveniently be of metallic wire mesh or, alternatively, may be of any material sufficiently stiff to maintain the desired shape. The addition of nozzles 17 results in diffusion of the gas from chambers 12 of FIG. 1 or chambers 52 of FIG. 2, through the mesh nozzles 17 in each instance and establishes the elongated front or interface 25 between the gases of differing refractive indices in each instance. Because of the much greater curvature of interface 25 as compared with interfaces 24 and 40, respectively, obtained without nozzles 17 as in the structures of my above-mentioned copending application, a much shorter focal length is obviously achieved by addition of nozzles 17.

In FIG. 3 are shown characteristic curves of focal length versus gas flow rates for only one gas interface in a representative device of the invention including a nozzle 17, and employing carbon dioxide as the gas of higher refractive index and argon as the gas of lower refractive index.

For a structure of the type illustrated in my above-mentioned copending application (that is, with nozzle 17 omitted) characteristic curves A, B, C and D were obtained where the flow rates of argon were 500, 800, 1000 and 1200 cubic centimeters per minute, respectively, as marked adjacent the respective curves.

With a "50 mesh" screen nozzle added, characteristic curves E, F, G and H were obtained where the flow rates of argon were 100, 200, 400 and 800 cubic centimeters per minute, respectively, as marked adjacent the respective curves.

It is obvious by inspection of the two above-described groups of characteristic curves that the use of mesh nozzles makes possible a substantial increase in the focusing strength of gas lenses of the type described hereinabove. It is also obvious that a substantial decrease in the volumes of one or both gases required to obtain a particular focal length may be effected by use of mesh nozzles. For example, for a focal length of substantially 15 meters, with mesh nozzles, the flows of argon and carbon dioxide required are in the order of 200 and 400 cubic centimeters per minute, respectively, whereas without mesh nozzles the flows of argon and carbon dioxide required are substantially 900 cubic centimeters per minute each, that is, over four times as much argon and over twice as much carbon dioxide are required.

Numerous and varied modifications and rearrangements of the above-described illustrative structures can be readily devised by those skilled in the art without departing from the spirit and scope of the principles of the invention. Accordingly, it is to be distinctly understood that the described embodiments are illustrative but are in no way to be taken as limiting the invention.

What is claimed is:

1. A gas lens for use in an ultrahigh frequency beam transmission system comprising an enclosing member, said member having oppositely positioned ports for injecting smooth flows of two transparent gases of differing refractive indices into the enclosing member in opposite directions along a common rectilinear axis to impinge upon each other to form a curved interface between said gases, one of said ports including a hollow porous nozzle extending into the enclosing member in the direction of the other port to increase the curvature of said interface, said lens including along said common axis a path for the transmission of a beam of ultrahigh frequency energy and exhaust means for extracting gas from said member.

2. The lens according to claim 1 wherein said nozzle is a wire mesh.

3. The lens according to claim 1 wherein said nozzle is a cylindrical element having numerous holes extending through its peripheral surface.

4. A gas lens for focusing an optical beam comprising: an enclosure having two, oppositely-positioned ports whose centers lie along a common axis, and along which said optical beam is directed; means for injecting a first transparent gas into said enclosure through one of said ports; means for injecting a second transparent gas having a different refractive index than said first gas into said enclosure through the other of said ports; means comprising a hollow porous nozzle extending into said enclosure from one of said ports for controlling the focal length of said lens; and exhaust means for extracting gas from within said enclosure.

No references cited.

JOHN K. CORBIN, *Primary Examiner.*